(12) United States Patent
Hait

(10) Patent No.: US 6,433,126 B1
(45) Date of Patent: Aug. 13, 2002

(54) PREPARATION OF COPOLYCARBONATES VIA SOLID STATE POLYMERIZATION

(75) Inventor: Sukhendu Bikash Hait, Tuscaloosa, AL (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/681,755

(22) Filed: May 31, 2001

(51) Int. Cl.[7] .............................................. C08G 64/00

(52) U.S. Cl. ....................................... 528/196; 528/198

(58) Field of Search ................................ 528/196, 198

(56) References Cited

U.S. PATENT DOCUMENTS 4,948,871 A    8/1990  Fukuoka et al. ............ 528/481

*Primary Examiner*—Terressa M. Boykin
(74) *Attorney, Agent, or Firm*—Andrew J. Caruso; Noreen C. Johnson

(57) ABSTRACT

Polycarbonate copolymers have been prepared by solid state polymerization (SSP). A mixture comprising partially crystalline BPA polycarbonate oligomer having a weight average molecular weight of 10,000 daltons and a source of additional structural units and optionally a catalyst is reacted under SSP conditions to afford a copolycarbonate. Sources of additional structural units include high and low molecular weight polycarbonates incorporating repeat units not derived from BPA and various bisphenols such as BPI, BPM and tetramethyl BPA.

14 Claims, No Drawings

PREPARATION OF COPOLYCARBONATES VIA SOLID STATE POLYMERIZATION

BACKGROUND OF INVENTION

This invention relates generally to the production of improved copolycarbonates incorporating varying structural units and a method for their preparation via solid state polymerization.

There is intense interest in new processable materials for use in a wide variety of challenging mechanical and optical applications. One such application is the production of modern optical devices such as optical data storage disks. Several polycarbonate based materials have been investigated for this purpose.

Polycarbonate resin that is suitable for optical applications requires special properties such as appropriate glass transition temperature, high purity and low water absorption. Traditionally, these polycarbonates are prepared by either interfacial polycondensation, or by a melt phase carbonate interchange reaction.

In a typical melt phase reaction process, a bisphenol, a diaryl carbonate and a suitable catalyst are combined to yield an oligomeric polycarbonate, usually with an average molecular weight ranging from 2,000 to 10,000 as determined by gel permeation chromatography, relative to polycarbonate or polystyrene. The oligomer produced typically has an intrinsic viscosity between 0.06 and 0.30 dl/g as determined in chloroform at 25° C. The oligomer may be converted to a high molecular weight polycarbonate through an increase in the polymerization temperature.

The melt phase process has a variety of disadvantages. For example, the melt viscosity of the oligomer greatly increases at very high conversions (>98%), thereby rendering the handling of such high viscosity melt polymerization mixtures difficult. This difficulty in handling increases the likelihood of hot spots along the reactor walls and poor mixing. Another disadvantage to the melt-phase process is that it requires special equipment such as a Helicone mixer, operating at temperatures in the range of 270 350° C. at subambient pressure.

In a typical interfacial polycondensation process, a dihydroxyaromatic compound, such as bisphenol A, is reacted with phosgene in a mixed aqueous-organic solution in the presence of an acid acceptor, and an appropriate catalyst, for example an amine.

The interfacial polycondensation process suffers from a variety of disadvantages as well. Toxic and hazardous phosgene is utilized in these reactions. Further, the interfacial polycondensation process typically employs a chlorinated hydrocarbon, such as methylene chloride, as an organic solvent and therefore carries the burden of substantial and costly environmental management of the solvent to prevent unintended emissions. Furthermore, the product will contain residual sodium and chloride ions that negatively affect the product's hydrolytic stability and water absorption characteristics.

More recently, solid state polymerization ("SSP") has been utilized as an improved process for preparing high molecular weight polycarbonates. SSP offers several advantages over both the melt phase process and the interfacial polycondensation process. SSP utilizes considerably lower temperatures than the melt phase process, (i.e., in the range of 180–230° C.). Also, the SSP process does not require handling melt at high temperatures like the melt phase process, and no special equipment is required to perform the process. Further, toxic chemicals such as phosgene are not utilized in the SSP process, and because an organic solvent is unnecessary, the process does not raise environmental concerns attendant upon the use of volatile organic solvents. Polycarbonate produced by SSP may be prepared largely free of the high levels of sodium and chloride ions found in interfacially prepared polycarbonate. As such, polycarbonates prepared by SSP are anticipated to show improved hydrolytic stability.

Typically in an SSP process, a partially crystalline polycarbonate oligomer is heated at a temperature below the sticking temperature of the polymer, but above the glass transition temperature of the polymer, and the volatile by-products, phenol, diphenyl carbonate and the like, are removed. The polycondensation reaction which converts the low molecular weight oligomer to high polymer proceeds strictly in the solid state under these conditions.

Melt transesterification routes to copolymers which involve the reaction of a dihydroxyaromatic compound and a comonomer with a diaryl carbonate at high temperature, may be of limited use when the comonomer has limited thermal stability and decomposes under the conditions of the melt reaction. Therefore the use of solid state polymerization conditions, which are usually milder and require lower polymerization temperatures than melt polymerization, could be of use for the preparation of copolycarbonates containing soft blocks and/or birefringence-decreasing units which may suffer thermal degradation under the more forcing conditions used for melt polymerization. Many monomers, however, especially soft block monomers such as polyethylene glycol and polytetrahydrofuran, may degrade even under standard SSP conditions and new methods of preparing copolycarbonates by solid state polymerization continue to be sought. An alternative method of incorporating the copolymeric units in a polymer ultimately produced by SSP is therefore necessary.

Solid state polymerization utilizes a substantially lower temperature, in the range of 180–230 C., than a simple melt process. SSP does not require handling molten polymer at high temperatures. The use of the soft block requires the process to be run at relatively low temperatures. This process is also capable of being performed with very simple equipment that limits the problems which larger, more complex equipment may cause.

Solid state polymerization, specifically polycondensation, may be executed by heating a crystallized polycarbonate oligomer in powder or pelletized form, and optionally a suitable catalyst, in a fixed bed configuration while passing a stream of inert gas through the crystallized oligomer. The reaction temperature and time may vary according to the type (chemical structure, molecular weight, etc.) of the crystallized oligomer. However, the reaction temperature should be at least above the glass transition temperature and below the melting or sticking point of the oligomer. Observation of these temperature limits prevents the oligomer from fusing during the solid state polycondensation. Since the melting point of the crystallized oligomer increases during the course of polycondensation, it is therefore desirable to increase the polycondensation temperature gradually over the course of the reaction. Generally the temperature should be 10–50° C. below the melting point of the oligomer and in the range of 180–230° C. If the reaction is allowed to take place within this range of temperatures, a high molecular weight polycarbonate can be formed.

A typical SSP process has two stages. First, a low melt viscosity linear oligomer is created by reacting in the molten phase a bisphenol with a diaryl carbonate. Typically, a mixture of a bisphenol compound and a diaryl carbonate is heated at 150° C. to 325° C. for approximately 4 to 10 hours along with a transesterification catalyst to prepare an oligomer having an average molecular weight of 2,000–20,000, and having both hydroxyl and carbonate end groups. Subsequent crystallization of the linear polycarbonate oligomer may be effected by: (a) dissolving the oligomer in a solvent and evaporating the solvent in presence of a suitable catalyst; (b) suspending the oligomer in a diluent and refluxing it for 0 to 10 hours in presence of a suitable catalyst followed by evaporating the diluent; or (c) heating the oligomer with a catalyst at a programmed temperature (greater than the glass transition temperature of the oligomer, but less than the melting point of the oligomer). Preferable solvents and diluents include aliphatic aromatic hydrocarbons, ethers, esters, ketones, and halogenated aliphatic and aromatic hydrocarbons. The resulting oligomer has a crystallinity of between 5% and 55% as measured by differential scanning calorimetry.

During the SSP process, the volatile by-products are removed from the reaction system to allow the reaction to progress. An inert gas is thus passed through the SSP reactor which aids the removal of the volatile by-products. The inert gases which are generally used are Nitrogen ($N_2$), Helium (He), Argon (Ar) etc., and the flow rate of the carrier gas varies from 0.1 to 4 L/min depending upon the type of reactor and the particle size of the oligomer. The rate of polycondensation may be dependent on the type and the flow rate of the carrier gas.

Polycarbonates are already widely used for the fabrication of optical data recording media, including optical disks as exemplified by compact audio disks and optical data storage disks used in computers. The optical requirements of such disks, particularly those having read-write capability make it essential or at least strongly preferred that they have low birefringence. Reducing birefringence increases the readability of the optical devices. Unfortunately, polycarbonates prepared from bisphenol A, the most widely used monomer for polycarbonate synthesis, tends to import a high level of birefringence to polycarbonate derived from it. Birefringence may be lowered for optical purposes by incorporation of such monomers as 6,6"-dihydroxy-3,3,3",3"-tetramethyl-1,1"-spiro(bis)indane ("SBI"), or 1,1 ,3-trimethyl-3-(4-hydroxyphenyl)-5-hydroxyindane ("CD-1") into the polycarbonate backbone.

Birefringence has several sources, including the structure and physical properties of the polymer material, the degree of molecular orientation in the polymer material and thermal stresses in the processed polymer material. In articles molded from polymeric materials, birefringence is related to orientation and deformation of its constituent polymer chains. For example, the birefringence of a molded optical article is determined, in part, by the molecular structure of its constituent polymer and the processing conditions, such as the forces applied during mold filling and cooling. The thermal stresses arising during fabrication of a molded article result in orientation and or deformation of the polymer chains.

It is also frequently desirable to improve the processability of polycarbonates by the incorporation, for example, of "soft blocks" derived from aliphatic compounds such as alkanedioic acids or polyoxyalkylene glycols. This is particularly important in optical disk fabrication, since processability may suffer due to the presence of such birefringence reducing comonomers as SBI and CD-1, which are a result of such factors as increase in glass transition temperature.

SUMMARY OF INVENTION

The present invention addresses these problems, and provides further surprising properties. These and further objects of the invention will be more readily appreciated when considering the following disclosure and appended claims.

The present invention relates to a method for preparing polycarbonate copolymers, prepared by solid state polymerization, said method comprising the steps of: preparing a mixture comprising partially crystalline bisphenol A polycarbonate oligomer and at least one source of additional structural units; and subjecting said mixture to solid state polymerization to provide a copolycarbonate.

The method further relates to copolycarbonates prepared by the method of the present invention.

The present invention is based on the discovery that copolymeric units may be incorporated in a precursor copolycarbonate by various procedures. Said precursor copolycarbonates, are subsequently exposed to SSP conditions. The methods of the present invention results in copolycarbonate compositions having desirable properties, which may include improved processability and low birefringence, higher or lower Tg's than those based on BPA alone, greater stability, and improved resistance to water absorption.

DETAILED DESCRIPTION

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

As used herein the term "interfacial process" refers to a process comprising the simultaneous use of water and a water immiscible solvent.

The term "polycarbonate" as used herein may include copolycarbonates, homopolycarbonates and (co)polyestercarbonates.

As used herein the term "aromatic radical" refers to a radical having a valence of at least one comprising at least one aromatic group. Examples of aromatic radicals include phenyl, pyridyl, furanyl, thienyl, naphthyl, phenylene, biphenyl. The term includes groups containing both aromatic and aliphatic components, for example a benzyl group.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

In one aspect, the present invention relates to the production of copolycarbonates useful in a wide variety of challenging mechanical and optical applications. One such application is the production of the next generation of optical devices.

The essential constituents employed in the method of this invention are sometimes designated "components" irrespective of whether they are or are not believed to undergo reaction during the practice of said method.

The first component is an oligomeric bisphenol A polycarbonate which is referred to as the precursor polycarbonate. Such bisphenol A polycarbonate oligomers often have an intrinsic viscosity in the range of 0.06–0.30 dl/g, all intrinsic viscosity values herein being as determined in chloroform at 30° C.

The second component is the source of additional structural units other than those present in BPA polycarbonate. These additional structural units, when incorporated into the bisphenol A polycarbonate chain provide copolycarbonates having improved properties relative to bisphenol A polycarbonate itself.

Monomers or oligomeric or high molecular weight homo- and copolycarbonates, similar to BPA, may be employed as the second component, with the proviso that they contain units not present in BPA polycarbonate. Where the source of additional structural units is a bisphenol it may be selected from bisphenols having general structure I

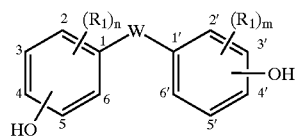

wherein W is a $C_1$–$C_{10}$ alkyl radical, a $C_4$–$C_{20}$ cycloalkyl radical, a $C_4$–$C_{20}$ aryl radical, O, or S; wherein $R_1$ is independently at each occurrence a $C_1$–$C_{10}$ alkyl radical, a $C_4$–$C_{10}$ cycloalkyl radical, or a $C_4$–$C_{10}$ aryl radical; wherein m and n are independently integers from 0 to 4; and wherein if both m and n are 0, and W is an isoprpylidene group the hydroxy groups of structure I are not located at the 4 and 4" positions.

Particularly preferred as the second component are bisphenols such as bis(4-hydroxyphenyl)-3,3,5-trimethylcyclohexane referred to interchangeably here as BPTMC and BPI; Bisphenol-M (BPM); and 3,3',5,5'-tetramethylbisphenol A (TMBPA).

Where the source of additional structural units is a polycarbonate it may be selected from polycarbonate polymers or oligomers containing repeat units having structure II

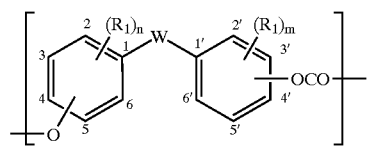

wherein W is a $C_1$–$C_{10}$ alkyl radical, a $C_4$–$C_{20}$ cycloalkyl radical, a $C_4$–$C_{20}$ aryl radical, O, or S; wherein $R_1$ is independently at each occurrence a $C_1$–$C_{10}$ alkyl radical, a $C_4$–$C_{10}$ cycloalkyl radical, or a $C_4$–$C_{10}$ aryl radical; wherein m and n are independently integers from 0 to 4; and wherein if both m and n are 0, and W is an isoprpylidene group the oxygen linking groups of structure II are not located at the 4 and 4" positions.

Praticularly preferred are polycarbonate oligomers such as o,p-BPA polycarbonate oligomer and TMBPA polycarbonate.

In one embodiment, the source of additional structural units is BPTMC. Copolymers of BPA and BPTMC are prized for their higher heat performance and their reduced birefringence relative to BPA polycarbonate. Copolycarbonates incorporating structural units derived from BPA and BPTMC are prepared by the method of the present invention.

In another embodiment, the method of the present invention affords a copolycarbonate containing BPM derived structural units. Said copolycarbonates have Tg's 2–10° C. lower than standard grades of BPA homopolycarbonates. Such materials, because of their lower glass transition temperatures, are anticipated to possess improved flow/ductility behavior relative to BPA homopolycarbonates.

Another embodiment utilizes o,p-BPA as the precursor polycarbonate. o,p-BPA represents an untapped opportunity as a little explored monomer for copolycarbonates. The current BPA manufacturing process generates substantial amounts of o,p-BPA which is subsequently isomerized to the p,p isomer. These copolymers exhibit greater stability relative to BPA polycarbonate. The cause for the increase in stability is believed to be the role of the o,p-BPA as a hindered phenol end group.

Studies of interfacial copolymerization of relatively large amounts of o,p-BPA (approximately 2 mole %) with BPA result in brittle, low molecular weight materials having high color and poor color stability. It has been determined that copolymers of o,p-BPA containing relatively large amounts of o,p-BPA (4 mol %–10 mol %) may be prepared by way of solid state polymerization of mixtures of low molecular weight o,p-BPA polycarbonate oligomers with BPA polycarbonate oligomers (R2 resin). The resulting copolymers exhibit unexpectedly increased melt and hydrolytic stability.

The copolymerization of low molecular weight BPA polycarbonate oligomer with TMBPA monomer and the soft block PEG-400 (polyethylene glycol having a molecular weight of approximately 400) is another embodiment of the present invention. Improved properties (in comparison to BPA) include lowered birefringence and increased hydrolytic stability. TMBPA derived polycarbonates (PC) are known to display improved (lower) birefringence relative to BPA-PC. Improved hydrolytic stability of these materials is due to the interaction of the flanking methyl groups on some fraction of the carbonate linkages. The restriction on the rotation about the carbonate linkages results in the reduction of toughness and flow of the polymer. Combinations of BPA and TMBPA or BPA, TMBPA and a soft block segment may improve the hydrolytic stability of resultant polymers without sacrificing the toughness and flow required for high performance. Birefringence will also be reduced. This reduction can make these materials useful for optical data storage devices. Low birefringence and low susceptibility to hydrolysis are critical performance characteristics in some optical disk applications.

Typically, solid state polymerization may be conducted in a vessel capable of producing intimate gas-solid contact, such as a fixed bed reactor, a fluidized bed reactor or a paddle mixer, in contact with an inert gas such as nitrogen or argon which serves as the fluidizing gas if a fluidized reactor bed is employed. Said inert gas may serve one or both of the purposes of fluidizing the mixture and volatizing and removing by-products, including water, hydroxyaromatic compound (such as phenol) corresponding to the carbonate employed to produce the precursor copolycarbonate, and any volatile carbonate formed as a by-product. Programmed heating may be advantageously employed.

The SSP process involves the formation of a mixture of BPA polycarbonate (BPA PC) oligomer and the second source of structural units. The resulting mixture may be ground and exposed to a solvent. Exposure of the bisphenol A polycarbonate oligomer induces its partial crystallization. Preferably, the solvent used does not dissolve the polycarbonate but simply induces crystallization. In such instances the solvent is referred to as a diluent. One such solvent is dimethyl carbonate. Other solvents that can be used to enhance crystallinity are chlorinated hydrocarbons, such as methylene chloride, chloroform, 1,2-dichloroethane, chlorobenzene, and o-dichlorobenzene. Non-solvents, liquids in which polycarbonate negligible solubility, may be employed. $C_1$–$C_{20}$ alkanols can be employed to induce crystallization of the BPA polycarbonate oligomer as can water. The solvent is then removed by evaporation and the partially crystalline oligomeric polycarbonate may be further dried under vacuum before being subjected to SSP conditions.

EXAMPLES

The following examples are set forth to provide those of ordinary skill in the art with a detailed description of how the copolycarbonates and methods claimed herein are evaluated, and are not intended to limit the scope of what the inventors regard as their invention. Unless indicated otherwise, parts are by weight, temperature is in ° C.

Molecular weights were determined by gel permeation chromatography. Mw is given as weight average molecular weight.

$R_2$ oligomer refers to oligomeric bisphenol A polycarbonate having a weight average molecular weight of under 10,000 daltons.

HEG(BPA)$_2$ is a known quaternary ammonium salt of BPA prepared by reacting a mixture comprising BPA and the sodium salt of BPA with hexaethyl guanidium chloride.

The distribution of structural units other than BPA derived structural units in the polycarbonate copolymers of the present invention may be illustrated as follows. The product polycarbonate copolymer (100 milligrams) is placed in a sealable vial and d6-acetone (5 milliliters) is added to the vial which is then sealed. After 24 hours, the d6-acetone is removed by filtration to provide a filtrate and a recovered solid. $^1$H-NMR of the filtrate provides a ratio of BPA derived to non-BPA derived structural units in the low molecular weight fraction. The recovered solid is dissolved in CDCL$_3$ and its $^1$H-NMR spectrum is measured thereby providing a ratio of BPA derived structural units to structural units other than BPA. Where the ratio of BPA derived structural units to structural units introduced into the polymer backbone by SSP is different in the d6-acetone soluble and CDCL$_3$ soluble fractions, the distribution of the non-BPA derived structural units introduced by SSP is said to be unsymmetrical. Where the ratio of BPA derived structural units is lower in d6-acetone soluble fraction than in the CDCL$_3$ fraction, the polymer is said to contain a higher concentration of the additional structural units in the low molecular weight polymer chains of the copolymer. The lower molecular weight polymer chains of the copolymer are referred to as the low molecular weight fraction.

Example 1

The procedure for copolymers prepared from lower molecular weight BPA-PC (R2 resin) and BPTMC comonomer is given below: Amorphous R-2 oligomer (22.86 g, 0.09 mole BPA), BPTMC (3.10 g, 0.01 mole) and diphenyl carbonate (DPC) (2.14 g, 0.01 mole) were charged to a 100 mL round bottom flask and exposed to a 70:30 mixture of dimethyl carbonate and methanol (total volume 50 mL) at room temperature for 1 hour. The solvent was then removed on a rotating evaporator and the residue dried under vacuum overnight. The resultant partially crystalline material was then subjected to solid state polymerization according to the protocol in Table 1.

TABLE 1

| Temp (° C.) | Time (h) | Tg (° C.) | Tm (° C.) | H (J/g) | Mw |
|---|---|---|---|---|---|
| Initial sample | — | 75 | 206 | 19 | 10100 |
| 180 | 12 | 131 | 229 | 32 | 13000 |
| 210 | 2 | 139 | 236 | 31 | 16900 |
| 220 | 2 | 146 | 243 | 29 | 22400 |
| 230 | 4 | 153 | 257 | 28 | 36900 |

Copolycarbonate of R2 oilgomer and BPTMC

As can be seen in Table 1, the reaction was followed by GPC and Tg. Both the $^1$H-NMR spectrum and the Tg are consistent with the incorporation of 50–100% of the initially charged BPTMC via this route.

Example 2

The procedure for copolymers prepared from lower molecular weight BPA-PC (R2 resin) and BPM comonomer is given below:

Amorphous R2 oligomer (22.86 g, 0.09 mole BPA), BPM (3.46 g, 0.01 mole) and DPC (2.14 g, 0.01 mole) were charged to a 100 mL round bottom flask and exposed to a 70:30 mixture of dimethyl carbonate and methanol (total volume 50 mL) at room temperature for 1 hour. The solvent was then removed on a rotating evaporator and then dried under vacuum overnight. The resultant partially crystalline material was then subjected to solid state polymerization according to the protocol in Table 2.

TABLE 2

| Temp (° C.) | Time (h) | Tg (° C.) | Tm (° C.) | DH (J/g) | Mw |
|---|---|---|---|---|---|
| Initial sample | — | 61 | 206 | 19 | 9100 |
| 170 | 12 | 107 | 224 | 32 | 8300 |
| 190 | 2 | 114 | 225 | 34 | 9550 |
| 210 | 2 | 121 | 231 | 28 | 14200 |
| 220 | 2 | 127 | 240 | 25 | 19300 |
| 230 | 2 | 131 | 247 | 17 | 25100 |
| 240 | 0.5 | 138 | 247 | 15 | 30800 |

Copolycarbonate of R2 oligomer and BPM

As can be seen in the chart, the reaction was followed by GPC and Tg. The Tg with the final product is consistent with the incorporation 50–100% of the initially charged BPM via this route.

Example 3

Powered BPA PC oligomer (R-2, 22.86 g, 0.09 mole) and o,p-BPA oligomer (2.54 g, 0.01 mole) were ground together and placed in a round bottom flask. Exposure of this mixture to methanol:dimethyl carbonate (30:70) and evaporation to dryness under vacuum afforded a partially crystalline material. Further vacuum drying afforded a free flowing white powder (Tm =221° C., 28 joule/g). This solid was subjected to solid state polymerization according to the following time temperature sequence, in Table 3, under a constant flow of nitrogen.

TABLE 3

| Time (h) | Temp (° C.) | Tm (° C.) | Tg (° C.) | DH (J/g) | Mw |
|---|---|---|---|---|---|
| 0 | | 114 | 221 | — | 9600 |
| 2 | 190 | 127 | 225 | — | — |
| 2 | 220 | 141 | 239 | — | — |
| 2 | 230 | 147 | 245 | — | 45000 |

Following SSP, the product was found to be characterized by $^1$H and $^{13}$C NMR and found to contain 8% o,p-BPA of the total bisphenol residues (80% of theory).

Example 4

Copolymers were prepared from low molecular weight BPA polycarbonate (R2 resin), TMBPA-PC and PEG-400 or BPA-PC (R2 resin), TMBPA comonomer and PEG-400. One embodiment of the invention is described by the following process:

Example 4a

R2 oligomer (14 g, 55 mmol),TMBPA-PC (6 g, 19 mmol) and HEG (BPA)$_2$ (0.7 mg, 50 ppm based on R2 oligomer weight) were melt mixed at 310° C. for 10 minutes in a tubular glass vessel equipped for mechanical stirring under a nitrogen atmosphere. The molten mixture was poured from the vessel and allowed to cool. The resultant solid was ground and slurried in sufficient dimethyl carbonate: methanol (70:30) to fully cover the sample. This mixture was stirred overnight at room temperature. The solvent was removed under reduced pressure (rotovap) and the resultant solid was dried under vacuum at approximately 90° C. The partially crystalline material was ground to fine particle size and a sample and a sample (12 g)as subjected to solid state polymerization according to the protocol given in table 4. Product high polymer was characterized by $^1$H-NMR, DSC (Tg =164° C.) and GPC. $^1$H -NMR (CDCL$_3$) indicates 26 mole % TMBPA in the copolycarbonate (100% theory).

TABLE 4

| Temp (° C.) | Time (h) | Tg (° C.) | Tm (° C.) | ΔH (J/g) | Mw |
|---|---|---|---|---|---|
| R2 | — | 108 | Amorpbous | — | 5600 |
| TMBPA-PC | — | 197 | Amorphous | — | 51000 |
| Initial Sample | — | 136 | 216 | 20 | 17700 |
| 200 | 2 | 141 | 216 | 22 | — |
| 210 | 3 | 144 | 232 | 20 | — |
| 220 | 2 | 153 | 240 | 21 | — |
| 230 | 12 | 164 | 256 | 21 | 71800 |

Copolycarbonate of R2 oligomer and TMBPA-PC oligomer

Example 4b

R-2 oligomer (13.3 g,52 mmol), TMBPA-PC (6 g, 19 mmol), PEG-400 (0.7 g, 1.8 mmol ) and HEG(BPA)$_2$ (0.7 mg) were melt mixed at 310° C. for 10 minutes. The molten mixture was poured from the vessel and allowed to cool. The resultant solid was ground and slurried in sufficient dimethyl carbonate: methanol (70:30) to fully cover the sample. This mixture was stirred overnight at room temperature. The solvent was removed under reduced pressure (rotovap) and the resultant solid was dried under vacuum at approximately 90° C. The partially crystalline material was ground to fine particle size and a sample and a sample (12 g) was subjected to solid state polymerization according to the protocol given in Table 5. Product high polymer was characterized by $^1$H-NMR, DSC (Tg =164° C.) and GPC. $^1$H -NMR (CDCL$_3$) indicates the presence of BPA, TMBPA and PEG residues in a 72:25:3 ratio (theory =71:26:2.5).

TABLE 5

| Temp (° C.) | Time (h) | Tg (° C.) | Tm (° C.) | ΔH (J/g) | Mw |
|---|---|---|---|---|---|
| R2 Oligomer | — | 108 | Amorphous | — | 9600 |
| TMBPA-PC | — | 197 | Amorphous | — | 51000 |
| Initial Sample | — | 111 | 189 | 10 | 9050 |
| 180 | 1 | 128 | 210 | 15 | — |
| 200 | 2 | 140 | 229 | 20 | — |
| 210 | 1 | — | — | — | — |
| 220 | 2 | 145 | 243 | 17 | — |
| 230 | 0.5 | 146 | 247 | 15 | 31700 |

Copolycarbonate of R2 oligomer, TMBPA-PC oligomer and PEG-400

Example 4c

R2 oligomer (22.86 g, 90 mmol), TMBPA (2.84 g, 10 mmol) and DPC (2.14 g, 10 mmol) were charged to a tubular glass vessel equipped for mechanical stirring under a nitrogen atmosphere and heated at 210° C. for 10 minutes. Then the molten polymer mixture was poured from the vessel and cooled to ambient temperature. The resultant crystalline mass was ground to a fine particle size and a sample (12 g) was subjected to solid state polymerization according to the protocol given in Table 6. Product high polymer was characterized by $^1$H-NMR, DSC and GPC.

TABLE 6

| Temp (° C.) | Time (h) | Tg (° C.) | Tm (° C.) | ΔH (J/g) | Mw |
|---|---|---|---|---|---|
| Initial Sample | — | 59 | 203 | 22 | 7100 |
| 150 | 0.5 | 77 | 209 | 29 | — |
| 170 | 1 | 98 | 218 | 30 | — |
| 190 | 2 | 118 | 229 | 29 | — |
| 200 | 2 | 127 | 233 | 26 | — |
| 220 | 4 | 136 | 253 | 24 | — |
| 230 | 2 | 143 | 269 | 32 | — |
| 240 | 4 | 148 | 277 | 39 | 38650 |

Copolycarbonate of R2 oligomer and TMBPA monomer

Example 4d

R2 oligomer (22.35 g, 88 mmol), TMBPA (2,84 g, 10 mmol), PEG-400 (0.8 g, 2 mmol) and DPC (2.14 g, 10 mmol) were charged to a tubular vessel equipped for mechanical stirring under a nitrogen atmosphere and heated at 210° C. for 10 minutes. Then the molten polymer mixture was poured from the vessel and cooled to ambient temperature. The resultant crystalline mass was ground to a fine particle size and a sample (12 g) was subjected to solid state polymerization according to the protocol given in Table 7. Product high polymer was characterized by $^1$H-NMR, DSC and GPC. $^1$H-NMR (CDCL$_3$) indicates the presence of BPA, TMBPA and PEG residues in a 89:9:2 ratio(theory =88:10:2). Triplets assigned to PEG-PEG carbonate and PEG-BPA carbonate linkages are observed at 4.09 and 4.48 ppm respectively.

TABLE 7

| Temp (° C.) | Time (h) | Tg (° C.) | Tm (° C.) | ΔH (J/g) | Mw |
|---|---|---|---|---|---|
| Initial Sample | — | 52 | 203 | 19 | 6750 |
| 150 | 0.5 | 58 | 206 | 30 | — |
| 170 | 1 | 78 | 215 | 30 | — |
| 190 | 2 | 103 | 221 | 24 | — |
| 200 | 14 | 115 | 224 | 24 | — |
| 220 | 2 | 119 | 244 | 19 | — |
| 230 | 2 | 123 | 255 | 23 | — |
| 240 | 2 | 128 | 267 | 23 | 26850 |

Copolycarbonate of R2 oligomer, TMBPA and PEG-400

The method of combining the above components results in the improved characteristics of the resultant composition.

The invention has been described in detail with particular reference to preferred embodiments thereof, but it will be understood by those skilled in the art that variations and modifications can be effected within the spirit and scope of the invention.

What is claimed is:

1. A method for preparing a polycarbonate copolymer, prepared by solid state polymerization, said method comprising the steps of:

preparing a mixture comprising partially crystalline bisphenol A polycarbonate oligomer and at least one source of additional structural units; and subjecting said mixture to solid state polymerization to afford a polycarbonate copolymer incorporating a higher concentration of the additional structural units in the low molecular weight fraction.

2. A method according to claim 1, wherein said source of additional structural units is a bisphenol having structure I

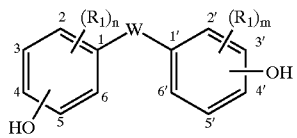

I wherein W is a $C_1$–$C_{10}$ alkyl radical, a $C_4$–$C_{20}$ cycloalkyl radical, a $C_4$–$C_{20}$ aryl radical, O, or S;

wherein $R_1$ is independently at each occurrence a $C_1$–$C_{10}$ alkyl radical, a $C_4$–$C_{10}$ cycloalkyl radical, or a $C_4$–$C_{10}$ aryl radical;

wherein m and n are independently integers from 0 to 4; and wherein if both m and n are 0, and W is an isoprpylidene group the hydroxy groups of structure I are not located at the 4 and 4' positions.

3. A method according to claim 1, wherein said source of additional structural units is a bisphenol polycarbonate having structure II

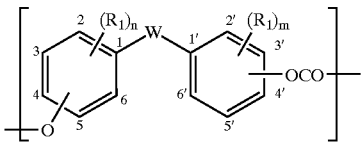

II wherein W is a $C_1$–$C_{10}$ alkyl radical, a $C_4$–$C_{20}$ cycloalkyl radical; a $C_4$–$C_{20}$ aryl radical, O, or S;

wherein $R_1$ is independently at each occurrence a $C_1$–$C_{10}$ alkyl radical, a $C_4$–$C_{10}$ cycloalkyl radical, or a $C_4$–$C_{10}$ aryl radical;

wherein m and n are independently integers from 0 to 4; and wherein if both m and n are 0, and W is an isoprpylidene group the hydroxy groups of structure II are not located at the 4 and 4' positions.

4. A method according to claim 1 wherein said mixture comprising partially crystalline bisphenol A polycarbonate oligomer and at least one source of additional structural units is prepared by exposure of a mixture comprising amorphous bisphenol A polycarbonate oligomer and at least one source of additional structural units to a mixture of methanol and dimethylcarbonate.

5. A method according to claim 1 wherein said mixture comprising partially crystalline bisphenol A polycarbonate oligomer and at least one source of additional structural units is prepared by heating a mixture comprising amorphous bisphenol A polycarbonate oligomer and at least one source of additional structural units in the melt at a temperature between about 190 and 250° C. in the presence of diphenyl carbonate.

6. A method according to claim 1 wherein said source of additional structural units is a bisphenol selected from he group consisting of 1,3-bis(2-(4-hydroxyphenyl)-2-propyl) benzene; 1,1-bis(4-hydroxyphenyl)-3,3,5-trimethylcyclohexane; 2,2-bis(3,5-dimethyl-4-hydroxyphenyl)propane.

7. A method according to claim 1 wherein said source of additional structural units is o,p-bisphenol A polycarbonate.

8. A polycarbonate copolymer prepared by solid state polymerization method, said method comprising the steps of:

preparing a mixture comprising partially crystalline bisphenol A polycarbonate oligomer and at least one source of additional structural units; and subjecting said mixture to solid state polymerization to afford a polycarbonate copolymer incorporating a higher concentration of the additional structural units in the low molecular weight fraction.

9. A polycarbonate copolymer according to claim 1, wherein said source of additional structural units is a bisphenol having structure I

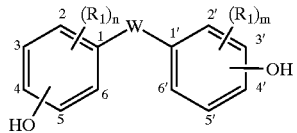

I wherein W is a $C_1$–$C_{10}$ alkyl radical, a $C_4$–$C_{20}$ cycloalkyl radical, a $C_4$–$C_{20}$ aryl radical, O, or S;

wherein $R_1$ is independently at each occurrence a $C_1$–$C_{10}$ alkyl radical, a $C_4$–$C_{10}$ cycloalkyl radical, or a $C_4$–$C_{10}$ aryl radical;

wherein m and n are independently integers from 0 to 4; and wherein if both m and n are 0, and W is an isoprpylidene group the hydroxy groups of structure I are not located at the 4 and 4' positions.

10. A polycarbonate copolymer according to claim 1, wherein said source of additional structural units is a bisphenol polycarbonate having structure II

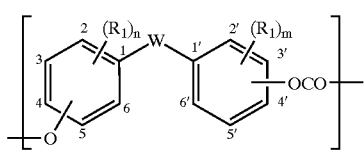

wherein W is a $C_1$–$C_{10}$ alkyl radical, a $C_4$–$C_{20}$ cycloalkyl radical, a $C_4$–$C_{20}$ aryl radical, O, or S;

wherein $R_1$ is independently at each occurrence a $C_1$–$C_{10}$ alkyl radical, a $C_4$–$C_{10}$ cycloalkyl radical, or a $C_4$–$C_{10}$ aryl radical;

wherein m and n are independently integers from 0 to 4; and wherein if both m and n are 0, and W is an isoprpylidene group the hydroxy groups of structure II are not located at the 4 and 4" positions.

11. A polycarbonate copolymer according to claim 1 wherein said mixture comprising partially crystalline bisphenol A polycarbonate oligomer and at least one source of additional structural units is prepared by exposure of a mixture comprising amorphous bisphenol A polycarbonate oligomer and at least one source of additional structural units to a mixture of methanol and dimethylcarbonate.

12. A polycarbonate copolymer according to claim 1 wherein said mixture comprising partially crystalline bisphenol A polycarbonate oligomer and at least one source of additional structural units is prepared by heating a mixture comprising amorphous bisphenol A polycarbonate oligomer and at least one source of additional structural units in the melt at a temperature between about 190 and 250° C. in the presence of diphenyl carbonate.

13. A polycarbonate copolymer according to claim 1 wherein said source of additional structural units is a bisphenol selected from he group consisting of 1,3-bis(2-(4-hydroxyphenyl)-2-propyl)benzene; 1,1-bis(4-hydroxyphenyl)-3,3,5-trimethylcyclohexane; 2,2-bis(3,5-dimethyl-4-hydroxyphenyl)propane (TMBPA).

14. A polycarbonate copolymer according to claim 1 wherein said source of additional structural units is o,p-bisphenol A polycarbonate oligomer.

* * * * *